United States Patent
Fiatal

(10) Patent No.: US 9,736,681 B2
(45) Date of Patent: Aug. 15, 2017

(54) SYSTEM FOR PROVIDING POLICY BASED CONTENT SERVICE IN A MOBILE NETWORK

(71) Applicant: Seven Networks, LLC, Marshall, TX (US)

(72) Inventor: Trevor Fiatal, Fremont, CA (US)

(73) Assignee: Seven Networks, LLC, Marshall, TX (US)

( * ) Notice: Subject to any disclaimer, the term of this patent is extended or adjusted under 35 U.S.C. 154(b) by 67 days.

(21) Appl. No.: 14/468,272

(22) Filed: Aug. 25, 2014

(65) Prior Publication Data

US 2014/0365560 A1 Dec. 11, 2014

Related U.S. Application Data

(63) Continuation of application No. 13/168,067, filed on Jun. 24, 2011, now Pat. No. 8,849,902, and a continuation of application No. 12/011,396, filed on Jan. 25, 2008, now Pat. No. 8,862,657.

(51) Int. Cl.
*H04W 8/24* (2009.01)
*G06F 17/30* (2006.01)
*H04L 29/06* (2006.01)

(52) U.S. Cl.
CPC ........ *H04W 8/24* (2013.01); *G06F 17/30905* (2013.01); *H04L 67/42* (2013.01)

(58) Field of Classification Search
None
See application file for complete search history.

(56) References Cited

U.S. PATENT DOCUMENTS

| 5,619,507 | A | * | 4/1997 | Tsuda | H04B 7/2125 370/350 |
| 5,619,648 | A | * | 4/1997 | Canale | G06Q 10/107 709/206 |
| 5,625,815 | A | * | 4/1997 | Maier | G06F 17/30595 |
| 5,692,039 | A | * | 11/1997 | Brankley | H04M 3/4228 379/221.08 |
| 5,701,469 | A | * | 12/1997 | Brandli | G06F 17/30622 |
| 5,706,507 | A | * | 1/1998 | Schloss | H04L 12/14 707/754 |

(Continued)

OTHER PUBLICATIONS

Non-Final Office Action mailed May 1, 2015 for U.S. Appl. No. 12/080,142.
USPTO Final Office Action mailed Nov. 23, 2015 for U.S. Appl. No. 13/523,669.

(Continued)

*Primary Examiner* — Ranodhi Serrao
(74) *Attorney, Agent, or Firm* — NK Patent Law, PLLC

(57) ABSTRACT

A policy based content delivery system is provided. The system includes a mobile device configured to select and receive content and a content source configured to provide content selected by the mobile device to a content server. The content source is further configured to modify content selected by the mobile device prior to the content server providing the selected content to the mobile device. A content server is configured to discover content at a content source and provide a list of detected content to the mobile device for selection. The content server is further configured to instruct the content source to provide the content in accordance with a policy. The content server includes a policy enforcement engine configured to implement a policy.

3 Claims, 5 Drawing Sheets

(56) References Cited

U.S. PATENT DOCUMENTS

| | | | |
|---|---|---|---|
| 5,752,186 A * | 5/1998 | Malackowski | H04M 3/382 |
| | | | 455/403 |
| 5,778,361 A * | 7/1998 | Nanjo | G06F 17/30622 |
| 5,781,906 A * | 7/1998 | Aggarwal | G06F 17/30327 |
| 5,787,430 A * | 7/1998 | Doeringer | H04L 45/54 |
| 6,336,117 B1 * | 1/2002 | Massarani | G06F 17/30867 |
| | | | 707/711 |
| 8,539,160 B2 | 9/2013 | Gallagher | |
| 9,485,804 B1 | 11/2016 | Evans | |
| 2002/0077084 A1 * | 6/2002 | Zellner | G06Q 30/0207 |
| | | | 455/414.2 |
| 2002/0120779 A1 * | 8/2002 | Teeple | H04L 29/06027 |
| | | | 709/246 |
| 2002/0155848 A1 * | 10/2002 | Suryanarayana | H04M 1/72561 |
| | | | 455/466 |
| 2003/0210666 A1 * | 11/2003 | Trossen | H04L 63/164 |
| | | | 370/331 |
| 2006/0052146 A1 | 3/2006 | Ou | |
| 2006/0069746 A1 | 3/2006 | Davis et al. | |
| 2006/0282408 A1 | 12/2006 | Wisely | |
| 2008/0008095 A1 | 1/2008 | Gilfix | |
| 2008/0207182 A1 * | 8/2008 | Maharajh | G06F 17/30035 |
| | | | 455/414.1 |
| 2009/0005072 A1 | 1/2009 | Forstall et al. | |

OTHER PUBLICATIONS

Final Office Action for U.S. Appl. No. 12/080,142 mailed on Sep. 22, 2015.
Frakes, Dan, HandBrake 0.9.0, Macworld Magazine, Dec. 21, 2006, pp. 1-5.

* cited by examiner

SYSTEM FOR PROVIDING POLICY BASED CONTENT SERVICE IN A MOBILE NETWORK

CROSS-REFERENCE TO RELATED APPLICATION(S)

The present application is a Continuation Application of U.S. patent application Ser. No. 13/168,067, entitled "SYSTEM FOR PROVIDING POLICY BASED CONTENT SERVICE IN A MOBILE NETWORK," filed Jun. 24, 2011, which claims priority to Divisional Application of U.S. patent application Ser. No. 12/011,396, entitled "POLICY BASED CONTENT SERVICE," filed Jan. 25, 2008, which is incorporated herein by reference.

TECHNICAL FIELD

The present invention relates generally to the field of wireless mobile device network services. More specifically, the present invention relates to serving user selected content in accordance with an enforcement policy.

BACKGROUND

The Internet allows users to access data remotely through a computer. Traditionally, the computer has been a desktop unit or laptop. Mobile devices now have the computing power to access data remotely and effectively function as a desktop or laptop.

Notwithstanding, there are numerous issues related to serving content to mobile devices. Each mobile device will have varying capabilities such as resident software applications, screen size, memory capacity, and processing power. Additionally, there are many preferences that a user may have or be subject to that when incorporated into the content serving process, limit the ability to serve content.

Effectively managing mobile device capabilities and user preferences would provide improved and enhanced content access on a mobile device.

SUMMARY

A system for policy based content delivery includes a mobile device, a content source, and a content server. The mobile device selects and receives content. The content source provides content selected by the mobile device to the content server. The content source modifies content selected by the mobile device prior to providing the selected content to the mobile device. The content server detects content at the content source. The content server provides a list of detected content to the mobile device for selection by the user. The content server instructs the content source to provide the content in a manner that is in accordance with a policy.

A system for policy based content delivery includes a mobile device, a content source, and a content server. The mobile device selects and receives content. The content source provides content selected by the mobile device to the content server. The content server detects content at a content source. The content server provides a list of detected content to the mobile device for selection by the user. The content server requests content from the content source. The content server includes a content reformatting engine to modify selected content in a manner that is in accordance with a policy.

A system for policy based content delivery includes a mobile device, a content source, and a content server. The mobile device selects and receives content. The content source provides content selected by the mobile device to the content server. The content source modifies content selected by the mobile device prior to providing the selected content to the mobile device. The content server detects content at a content source. The content server provides a list of detected content to the mobile device for selection by the user. The content server instructs the content source to provide the content in a manner that is in accordance with a policy. The content server includes a content reformatting engine to modify selected content in a manner that is in accordance with a policy.

A method for providing content in accordance with a policy includes discovering available content at a content source, requesting content located on a content source from a mobile device, processing the request from the mobile device at a content server, requesting content source to provide content in a manner that conforms to the enforcement policy, and transferring the requested content from the content source in a manner that conforms to the enforcement policy.

A computer program is stored on a computer readable storage medium. The program is executable by a processor for performing a method for providing user selected content to a mobile device. The method includes discovering available content at a content source, requesting content located on a content source from a mobile device, processing the request from the mobile device at a content server, requesting content source to provide content in a manner that conforms to the enforcement policy, and transferring the requested content from the content source in a manner that conforms to the enforcement policy.

DETAILED DESCRIPTION

Figure 1:
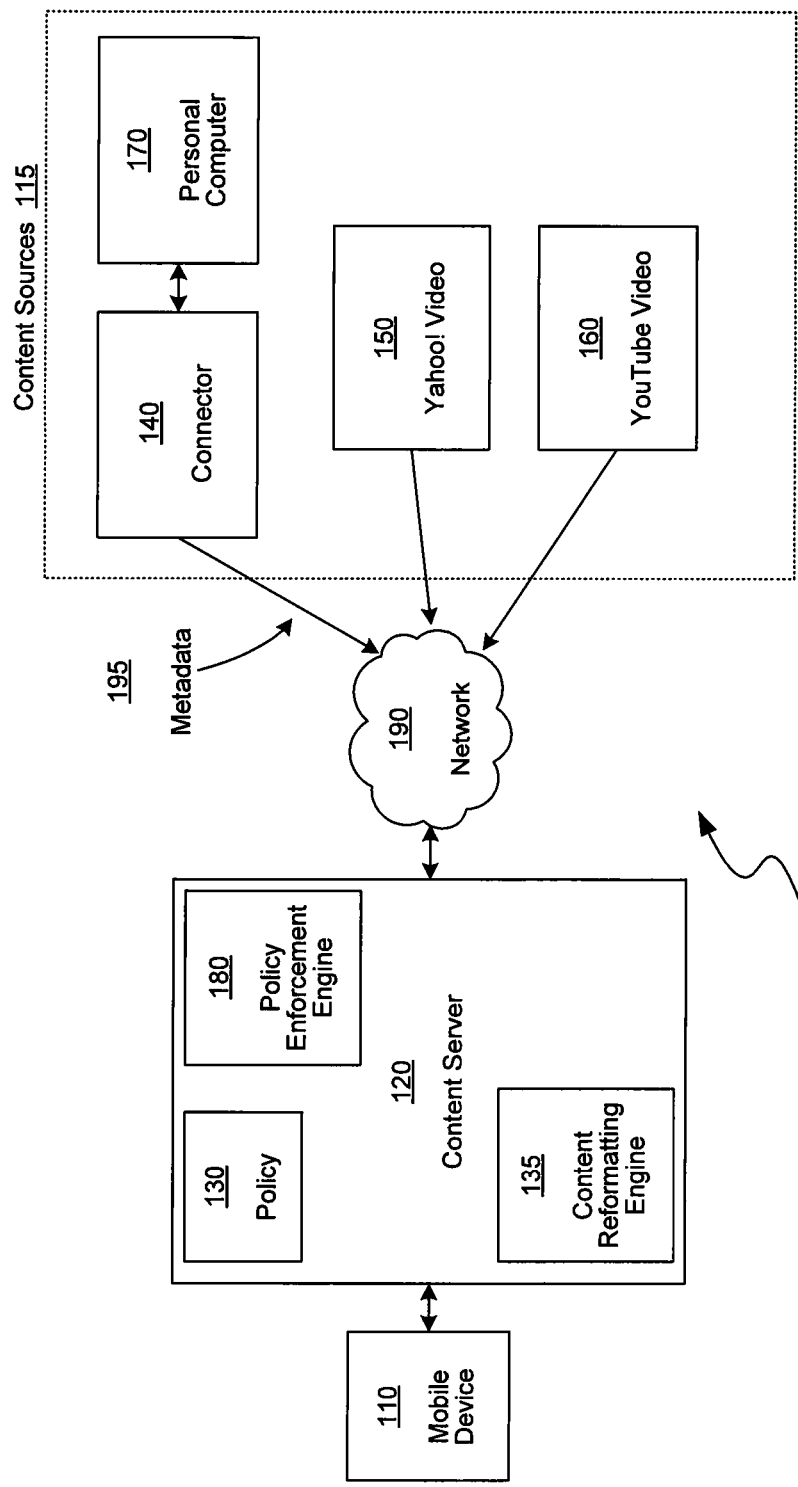
FIG. 1 depicts an exemplary system in which metadata is sent from a variety of content sources to a content server for content discovery.

FIG. 1 depicts an exemplary system 100 in which metadata is sent through a network 190 from a variety of content sources to a content server 120 for content discovery. Mobile device 110 requests content from a content source 115 as may be identified through a catalog, listing, or web pages associated with content source 115 or content server 120. Content source 115 may include a personal computer 170 or content portal such as Yahoo! Video 150 or YouTube Video 160.

Content server 120 receives metadata 195 from the content source 115 and determines the information concerning the requested content such as file size, format, encoded bit rate, and DRM limitations. Policy 130 is any one or combination of service provider restrictions, mobile device capabilities, and user preferences. The content server 120 uses policy 130 to identify what type of requested content may be transferred to the mobile device 110.

Policy enforcement engine 180 ensures that requested content transferred to the mobile device 110 meets the requirements of the policy 130. This enables the service provider, for example, to enforce the service policy on the user's transmissions. The content server 120 may then instruct the content source 115 whether the requested content should be provided.

For example, the requested content may be a still image. The content source will send metadata 180 to the content server 120 indicating, for example, the format and file size of the still image. In this example, the still image may have a file size of 4 MB and be in the bitmap format. The content server 120 will then use policy 130 and policy enforcement engine 180 to determine whether the requested content can be provided "as is" from the content server 115. If not, the policy enforcement engine 180 and content reformatting engine 135 may attempt to reformat the content prior to transfer to the mobile device in order to comply with policy 130.

In this example, the policy 130 may limit the file size to 2 MB and the picture format to jpeg. The content server 110 will instruct the content source 115, if possible, to provide the requested content as 2 MB jpeg file. If not available as a 2 MB jpeg, the policy enforcement engine 180 may instruct content reformatting 135 to modify the content that is available for delivery in compliance with the policy 130. In other situations, the policy 130 may limit the bit rate at which the transfer occurs, as well as resolution, total bandwidth, and transfer protocol.

Policy 130 may be modified or set according to personal user preferences. The user may add additional limits on the manner in which content is or is not provided to the mobile device 110. For example, the user can control the quality of the audio playback and the audio format to use when receiving audio content.

In FIG. 1, the personal computer 170 includes a connector 140. The connector 140 is a software application that allows a user to configure the personal computer 170 to provide content to the mobile device 110 via content server 120. The connector 140 may be configured by the user to allow desired folders and files on the personal computer to be accessible to the mobile device. In other embodiments, the connector 140 may be connected to other content sources. Personal computer 170, in an alternate embodiment, may include the policy 130, policy enforcement engine 180, and content reformatting engine 190.

The content server 120 may be configured to reformat downloaded digital content using the content reformatting engine 135. The content reformatting engine 135 may decode, encode, transcode, or resample digital content. The content reformatting engine 135 may initiate reformatting of the downloaded content in response to a command issued by the policy enforcement engine 180 or by the mobile device 110. Reformatting may also occur automatically according to user preferences reflected in the policy 130. The content reformatting engine 135 may include copying a file while changing a file format from one format to another, or while changing a bit rate or resolution such that the copy has a different bit rate or resolution than the original.

In one example, the content reformatting engine 135 reformats an MPEG-2 encoded video file to a 3GP encoded video file by copying the MPEG-2 encoded video file and saving the copied video file in the local content store 132 as a 3GP encoded video file. In a second example, the content reformatting engine 135 reformats an AVI encoded video file having a resolution of 720 by 480 pixels to an AVI encoded video file having a resolution of 360 by 240 pixels. In another example, the content reformatting engine 135 reformats an MPEG-4 encoded video file having a frame rate of approximately 30 frames per second (fps) to an MPEG-4 encoded video file having a frame rate of approximately 15 fps. By further example, the content reformatting engine 135 reformats an MP3 encoded audio file having a bit rate of 192 kilobits per second (kbps) to an MP3 encoded audio file having a bit rate of 128 kbps.

The content reformatting engine 135 may also reformat the content based upon a factor dependent on the mobile device 110, a user-selectable preference, or a preset preference. The factor dependent on the mobile device 110 may further include supported codecs (e.g., MP3 and WMA), bit rates (i.e., bits per second), sampling rates (i.e., samples per second), sample resolutions (i.e., bits per sample), and video frame rates (i.e., frames per second). The factor dependent on the mobile device 110 may also include processing power, memory size, free available memory, screen size, and screen resolution.

The reformatting may be performed such that the reformatted digital content transferred to the mobile device 110 corresponds to an optimal data size range as determined by factors listed above. As an example, the downloaded content may be reformatted to more compact file sizes when free available memory at the mobile device 110 is low. Alternatively, the downloaded content may be reformatted to larger file sizes when free available memory at the mobile device is high. As another example, the downloaded content may be reformatted to a lower resolution screen size when the mobile device 110 is a cellular telephone than when the mobile device 120 is a PDA. The downloaded content may be reformatted to resolution somewhat larger (finer) than the screen size resolution to allow the downloaded content to be zoomed and cropped to a reasonable degree at the mobile device 110.

Figure 2:
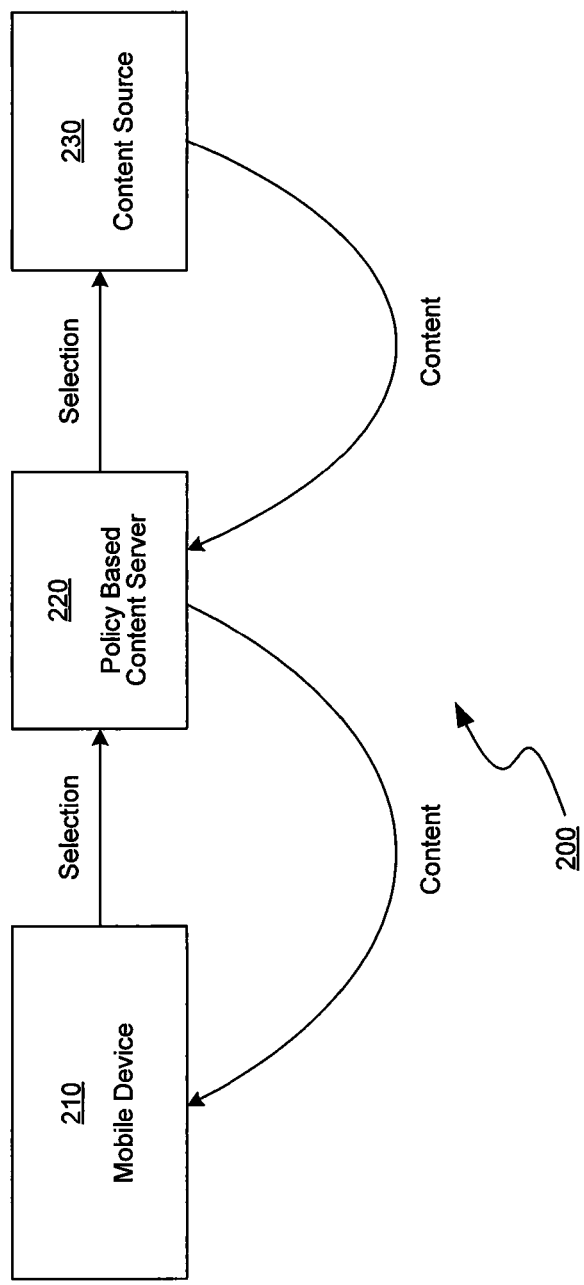
FIG. 2 depicts an exemplary system in which user selected content is sent from a content source through a policy based content server to a mobile device.

FIG. 2 depicts an exemplary system 200 in which user selected content is sent from a content source 230 through the policy based content server 220 to a mobile device 210. The policy based content server 220 corresponds to the content server 120 of FIG. 1. In this embodiment, policy enforcement occurs at the policy based content server 220.

Figure 3:
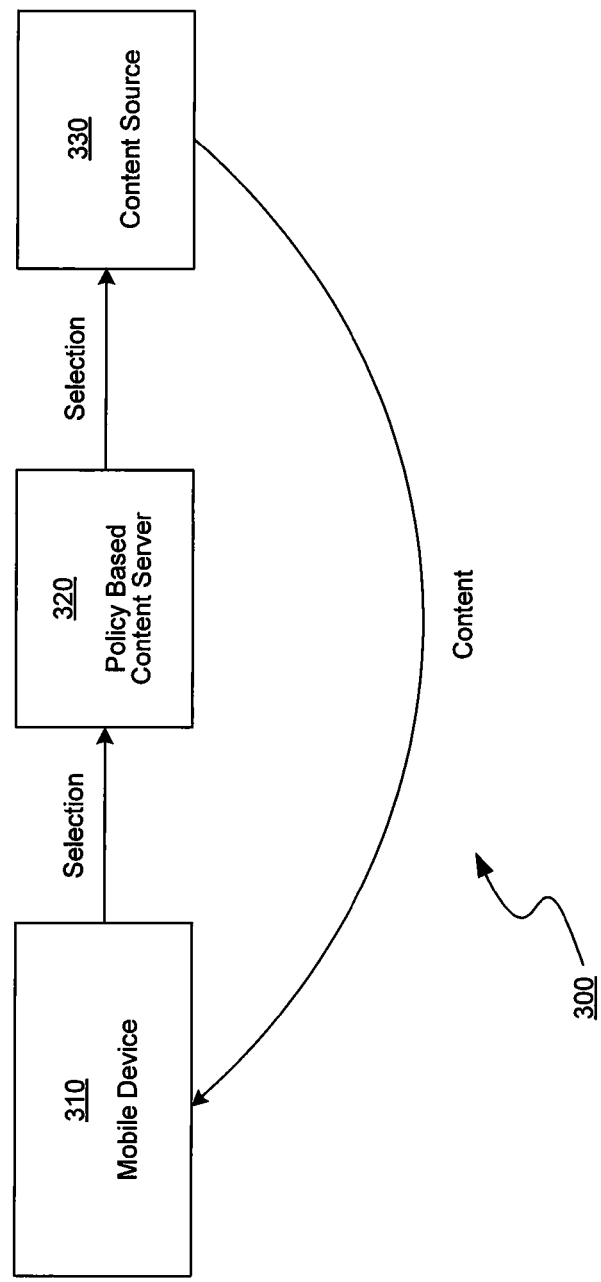
FIG. 3 depicts an exemplary system in which user selected content is sent directly from a content source with a connector to a mobile device.

FIG. 3 depicts an exemplary system 300 in which user selected content is sent directly from a content source with connector 330 to a mobile device 310. In this embodiment, the policy enforcement occurs at the content source with connector 330 as the content is not sent back through the policy based content server 320. A content source with connector 330 may be akin to the coupling or integration of the connector 140 and personal computer 170 in FIG. 1. A connector coupled to or integrated with the content source may perform policy enforcement at the content source. In some embodiments, content selection may bypass the policy based content server 320 and occur by and between mobile device 310 and content source 330.

Figure 4:
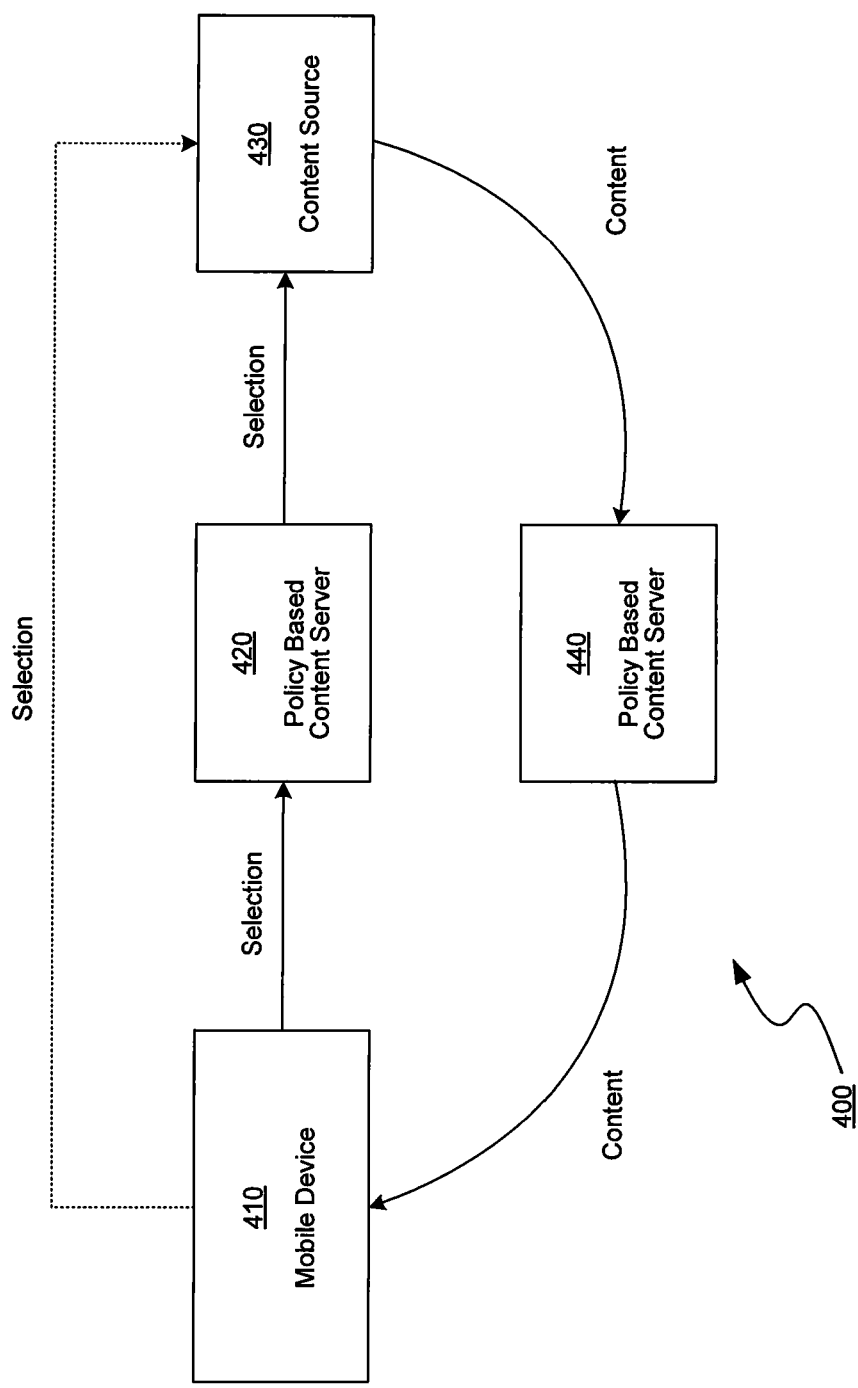
FIG. 4 depicts an exemplary system in which user selected content is sent from a content source with a connector through an approved external proxy to a mobile device.

FIG. 4 depicts an exemplary system 400 in which user selected content is sent from a content source with connector 430 through an approved external proxy 440 to a mobile device 410. The policy enforcement may occur at the content source 430 or the external approved proxy 440. Use of the external approved proxy 440 may be subject to the proxy having a connector application. The approved external proxy 440 may be a server remote from the service provider. Alternately, the external proxy 440 may be a separate server located at the same data center as the content based content server 420.

Figure 5:
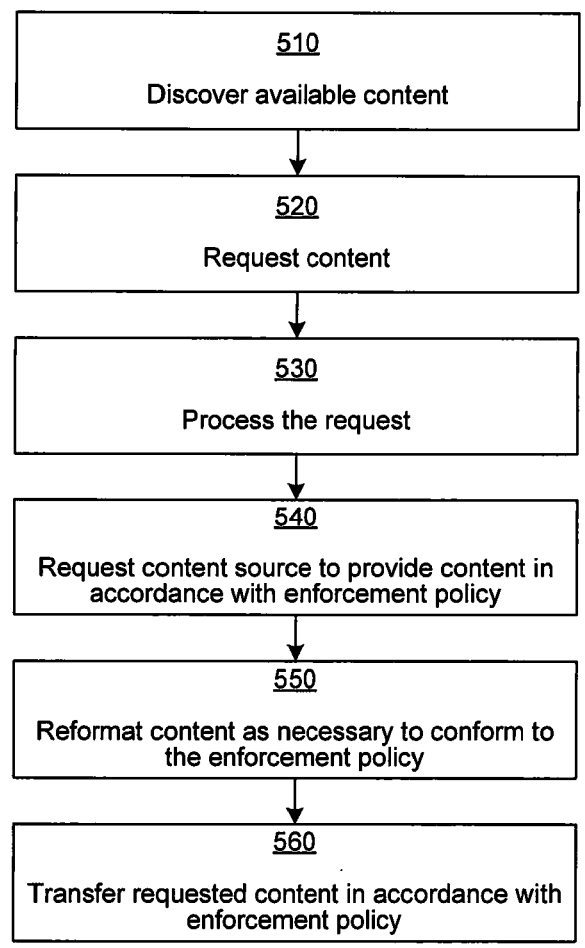
FIG. 5 depicts an exemplary method for policy based service of content.

FIG. 5 depicts an exemplary method for policy based service of content. Step 510 is the discovery of available content on a content source. Step 520 is the requesting of content located on a content source from a mobile device. Step 530 is the processing of the request from a mobile device at a content server. Step 540 is requesting the content source to provide content in a manner that conforms to a service policy. Step 550 is the optional reformatting of the selected content as necessary to conform to the enforcement policy. Step 560 is the transferred of the requested content from the content source in a manner that conforms to the enforcement policy to the mobile device.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

I claim:

1. A policy-based content delivery system comprising:
   a mobile device selecting and receiving video content directly from a content source; and
   the content source providing video content selected by the mobile device directly to the mobile device, the content source further reformatting content selected by the mobile device prior to providing the selected content to the mobile device;
   wherein the content source provides a list of detected content to the mobile device for selection, the content source further provides the content in accordance with a service provider policy,
   wherein video content selected and received by the mobile device bypasses and is not sent through a policy-based content server, and
   wherein the service provider policy is based on a bandwidth allocation and a screen size of the mobile device, and the video content is automatically reformatted by transcoding to a larger resolution than a resolution for the screen size in order to allow the video content to be zoomed at the mobile device and satisfy the bandwidth allocation.

2. The system of claim 1, wherein the policy encompasses user preferences.

3. The system of claim 1, wherein the content source is a personal computer including a connector to provide user selected content to the mobile device.

* * * * *